United States Patent [19]

Kim

[11] Patent Number: 5,796,707
[45] Date of Patent: Aug. 18, 1998

[54] OPTICAL RECORDING AND REPRODUCING APPARATUS HAVING MEANS FOR CORRECTING INSTALLATION ANGLE OF SPINDLE MOTOR

[75] Inventor: Seung-min Kim, Suwon, Rep. of Korea

[73] Assignee: Samsung Electronics Co., Ltd., Kyungki-do, Rep. of Korea

[21] Appl. No.: 731,015

[22] Filed: Oct. 9, 1996

[30] Foreign Application Priority Data

Apr. 23, 1996 [KR] Rep. of Korea ............ 96-12407

[51] Int. Cl.$^6$ ..................................... G11B 19/20
[52] U.S. Cl. ................ 369/219; 369/258; 369/269
[58] Field of Search ................ 360/98.07, 99.04, 360/99.08; 369/219, 223, 258, 264, 269; 310/91; 248/655, 656, 662

[56] References Cited

U.S. PATENT DOCUMENTS 4,438,879  3/1984  Rudi ........................ 360/96.3 X
4,506,857  3/1985  Hara et al. ................... 248/655

FOREIGN PATENT DOCUMENTS 60-163270   8/1985   Japan.
61-061268   3/1986   Japan.
61-090317   5/1986   Japan.
61-104335   5/1986   Japan.
1-279459   11/1989   Japan.

*Primary Examiner*—Stuart S. Levy
*Assistant Examiner*—William J. Klimowicz
*Attorney, Agent, or Firm*—Sughrue, Mion, Zinn, Macpeak & Seas, PLLC

[57] ABSTRACT

According to the present invention, an optical recording and reproducing apparatus includes a deck, a spindle motor installed on the deck, a turn table attached to the shaft of the spindle motor, and a method for correcting the installation angle of the spindle motor in order to correct the tilt angle of the turn table. According to the present invention, the tilt angle of the optical axis can be easily corrected, thereby improving the performance of the apparatus.

8 Claims, 4 Drawing Sheets

OPTICAL RECORDING AND REPRODUCING APPARATUS HAVING MEANS FOR CORRECTING INSTALLATION ANGLE OF SPINDLE MOTOR

BACKGROUND OF THE INVENTION

The present invention relates to an optical recording and reproducing apparatus, and more particularly, to an optical recording and reproducing apparatus for which a tilt angle of an optical axis can be corrected by adjusting the installation angle of a spindle motor which rotates a turn table.

The optical recording and reproducing apparatus is for reproducing the information recorded in optical recording media (which are referred to as disks) such as a compact disk, digital video disk, and a laser disk. The disk is loaded on the turn table installed in the optical recording and reproducing apparatus, and rotates. An optical pickup detects pits formed in the disk and produces a data signal therefrom.

FIG. 1 is a perspective view schematically showing a portion of a conventional optical recording and reproducing apparatus. An optical recording and reproducing apparatus 10 comprises a deck 11, a turn table 12 on which the disk (not shown) is loaded, a spindle motor 19 for rotating the turn table 12, an optical pickup 15 installed on the deck 11 and having rectilinear and reciprocating movement, a motor 16 for driving the optical pickup 15 in a rectilinear, reciprocating manner, and a screw shaft 18 for converting the rotational movement of the motor 16 into the rectilinear movement. On one side of the optical pickup 15, a tooth gear portion (not shown) engaged with the screw shaft 18 is formed. The optical pickup 15 moves along guide shafts 13 installed on the deck 11, and the direction of movement corresponds to the direction of rotation of the screw shaft 18.

To guarantee the accuracy of the data signal the laser beam from the optical pickup 15 should be perpendicularly incident on the disk. Inclined incidence of the laser beam with respect to the disk results in the so-called tilt angle of the optical axis. When the tilt angle of the optical axis increases, the signal reproducing performance decreases and pickup errors may be generated.

Generally, a tilt angle may be generated by low machining precision of parts or poor assembly of the parts. Therefore, to decrease or prevent tilt angle, the parts of the optical recording and reproducing apparatus must be precisely machined and assembled. In the optical recording and reproducing apparatus of a stereo compact disk, the tilt angle of the optical axis can be corrected by controlling the tolerance of the parts which are assembled. Because the stereo compact disk has a relatively small radius, a slight tilt angle does not present much of a problem.

However, in a recording and reproducing apparatus for a laser disk having a relatively large radius or a digital video disk in which information is densely recorded, it is difficult to correct the tilt angle of the optical axis by controlling the tolerance of parts. Therefore, the apparatus for controlling the tilt of the optical pickup 15 in the radial direction thereof is separately provided according to the position of the optical pickup 15. However, when such an apparatus for controlling the tilt of the optical pickup is applied to the apparatus for reproducing the data of a digital video disk, it is difficult to transfer the optical pickup 15 at a high speed, since the weight thereof is higher.

It is also possible to correct the tilt angle of the optical axis by adjusting the guide shafts 13 for supporting the optical pickup 15. However, since the respective guide shafts 13 are independently installed, the relative positions thereof to the optical pickup 15 tend to be different. Therefore, the tilt angle of the optical axis when the optical pickup 15 is near the spindle motor 19 is different from that of the optical pickup 15 when it is far from the spindle motor 19, which deteriorates the linear movement of the pickup 15.

SUMMARY OF THE INVENTION

It is an object of the present invention to provide an optical recording and reproducing apparatus having means for correcting the installation angle of a spindle motor and a turn table attached to the spindle motor in order to control the tilt angle of the optical axis.

To achieve the above object, there is provided an optical recording and reproducing apparatus, comprising a deck, a spindle motor installed on said deck, a turn table attached to the shaft of the spindle motor, and means for correcting the installation angle of the spindle motor in order to correct the tilt angle of the turn table.

Preferably, the correcting means comprises a motor housing having a plurality of horizontal protrusions formed on the outer surface of the motor housing. The protrusions are inserted in and supported by a plurality of grooves made in the deck. Elastic members are fixed on the upper surface of the deck, for pressing the plurality of horizontal protrusions against the plurality of grooves. Correcting screws are inserted into adjusting screw holes and end portions of the correcting screws contact the bottom surfaces of the horizontal protrusions.

According to another aspect of the present invention, the correcting means preferably comprises a plurality of horizontal protrusions which are inserted in and supported by a plurality of grooves. The protrusions are formed on the outer surface of the spindle motor. Elastic members are fixed to the upper surface of the deck, for pressing the plurality of horizontal protrusions. Correcting screws are inserted in the adjusting screw holes and end portions of the correcting screws contact the bottom surfaces of the horizontal protrusions.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
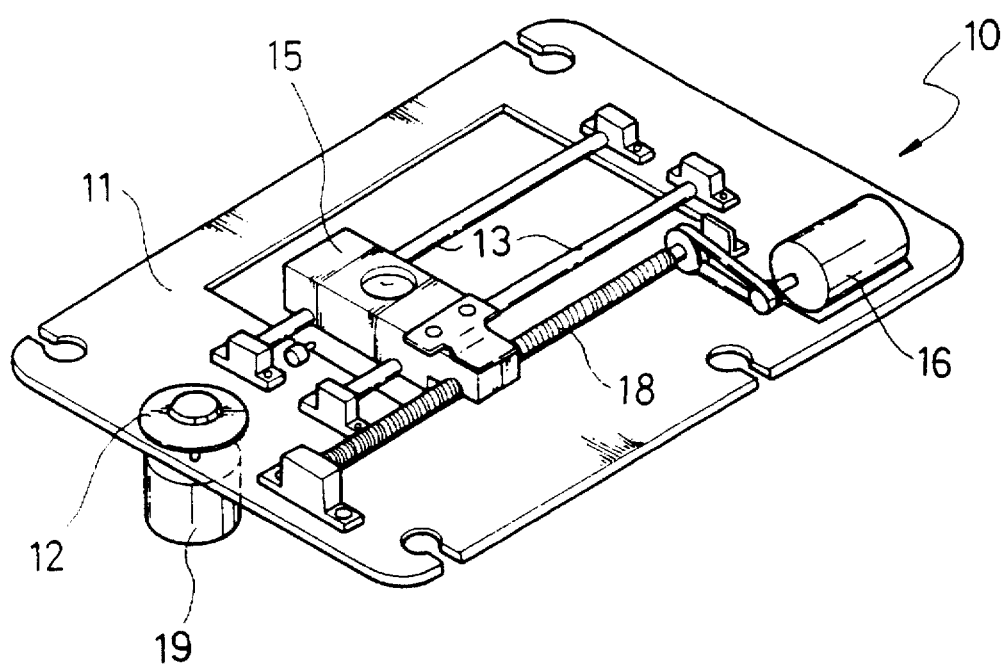
FIG. 1 is a schematic perspective view of a portion of an optical recording and reproducing apparatus according to the prior art.
Figure 2:
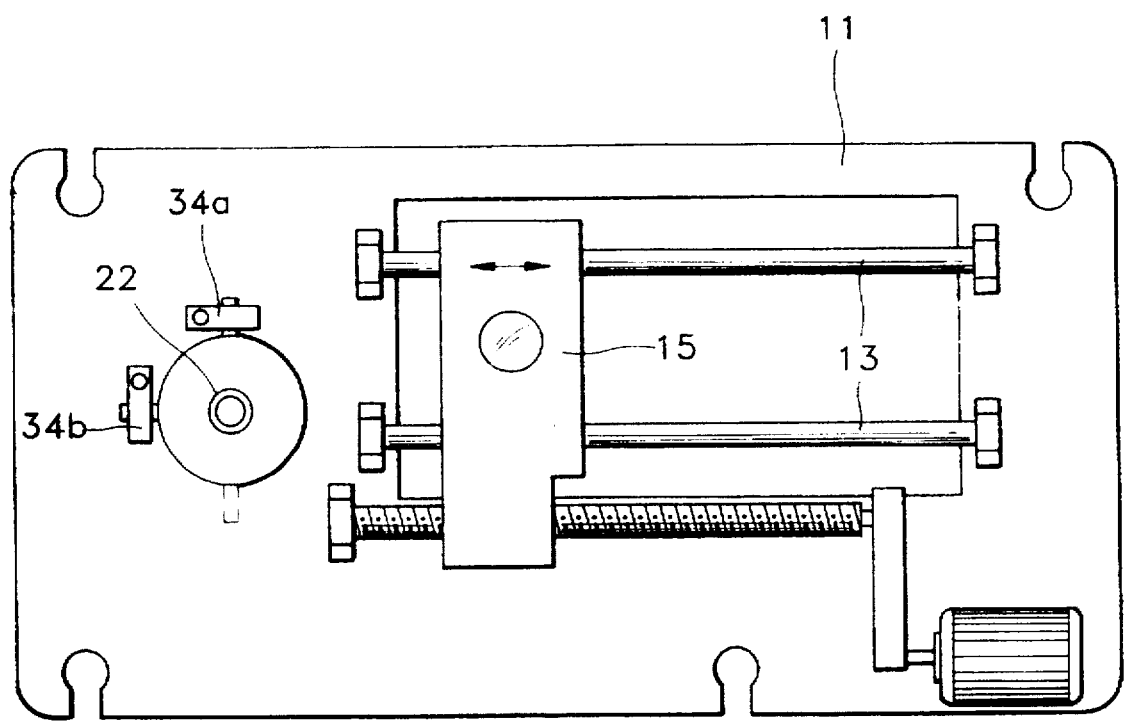
FIG. 2 is a plan view of a portion of an optical recording and reproducing apparatus having means for correcting the installation angle of a spindle motor according to an embodiment of the present invention.

FIG. 2 is a schematic plan view of a portion of an optical recording and reproducing apparatus according to a preferred embodiment of the present invention. Here, the same reference numerals as those of FIG. 1 indicate like elements having identical functions. According to FIG. 2, a means for correcting the installation angle of a spindle motor (not shown) is installed at one side of the optical pickup 15. An embodiment of the means for correcting the installation angle of the spindle motor is shown in detail in FIG. 3.

Referring to the above drawings, a spindle motor 29 is installed on a deck 11 through a motor housing 31. The motor housing 31 is cylinder-shaped so as to house the spindle motor 29 inside. Three horizontal protrusions 32a, 32b, and 32c are formed on the outside surface of the cylinder at angles of 90 degrees with respect to each other. The horizontal protrusions 32a, 32b, and 32c may be formed in the motor housing 31 by, for example, a plastic molding. The cross-sections of the horizontal protrusions 32a, 32b, and 32c may be, for example, rectangular or circular; preferably, circular. The spindle motor 29 can be connected to the motor housing 31 using screws (not shown), etc.

The motor housing 31 can be installed on the deck 11 by inserting the horizontal protrusions 32a, 32b, and 32c into grooves 41a, 41b, and 41c formed in the deck 11. The grooves 41a and 41b are formed in the radial direction of a disk (not shown). While the upper portions of the grooves 41a and 41b are opened, that of the groove 41c is closed. However, one side of groove 41c is opened. The motor housing 31 is placed on the deck 11 by inserting the horizontal protrusion 32c into the open side of the groove 41c and setting the other horizontal protrusions 32a and 32b in the grooves 41a and 41b. The upper portions of the grooves 41a and 41b in which the horizontal protrusions 32a and 32b are set are closed by elastic members 34a and 34b. The elastic members 34a and 34b are preferably plate springs. The elastic members 34a and 34b are fixed to the deck 11 by screws 35a and 35b. Even though not shown in the drawing, the upper portion of groove 41c may also be open, and the horizontal protrusion 32c set therein may be fixed by similar elastic member and screw.

In at least two grooves 41a and 41b among the grooves 41a, 41b, and 41c, adjusting screw holes 36a and 36b are formed.

Correcting screws 37a and 37b are respectively inserted in adjusting screw holes 36a and 36b from the lower surface of the deck 11. The end portion of the correcting screws 37a and 37b contact the horizontal protrusions 32a and 32b, respectively. Therefore, the lower surfaces of the horizontal protrusions 32a and 32b are supported by the end portions of the correcting screws 37a and 37b and the upper surfaces thereof contact the elastic members 34a and 34b to thereby be elastically biased.

The tilt angle of the motor housing 31 can be corrected by selectively rotating the correcting screws 37a and 37b thereby lifting or lowering the horizontal protrusions 32a and 32b on the basis of the horizontal protrusion 32c inserted in the groove 36c. In case of correcting the tangential direction tilt angle of the disk, the horizontal protrusion 32a is lifted or lowered by rotating the correcting screw 37a. Accordingly, the tilt angle of the motor housing 31 and the spindle motor 29 mounted therein can be adjusted with respect to the tangential direction of the disk, thereby changing the tilt of the turn table 22 (FIG. 2) and a disk loaded thereon.

To correct the radial direction tilt angle of the disk, the position of the horizontal protrusion 32b is adjusted by rotating the correcting screw 37b.

The correcting screws 37a and 37b are rotated until an error, detected by a measuring device which determines whether the tilt angle of the optical axis is generated or not, reaches the allowable limits. At this time, the horizontal protrusion 32c supported in the groove 41c serves as a standard point of the correction. After correcting the tilt angle of the optical axis, the motor housing 31 can be fixed to the deck 11 by, for example, an adhesive.

Figure 3:
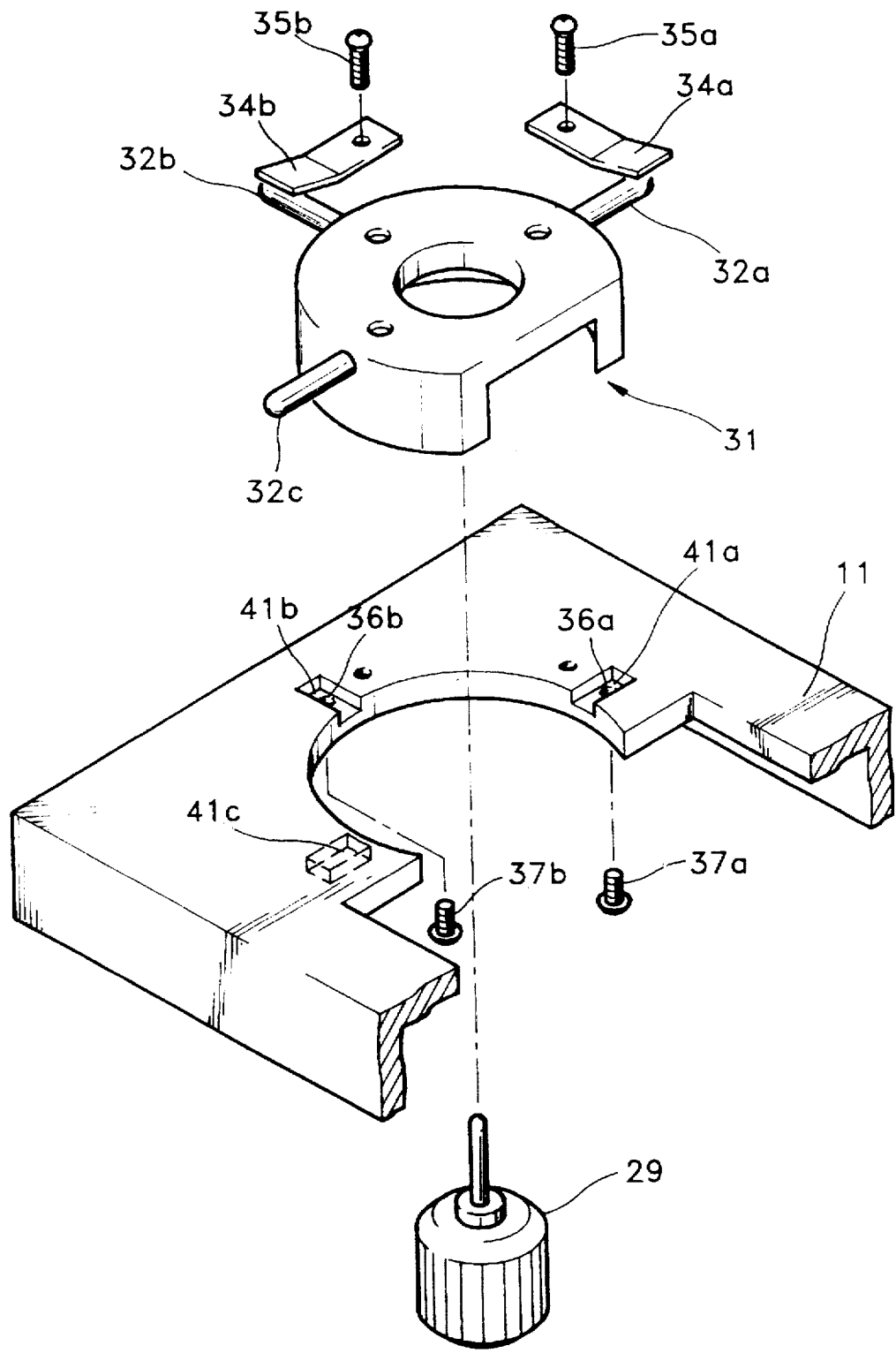
FIG. 3 is a exploded perspective view showing means for correcting the installation angle of the spindle motor of the optical recording and reproducing apparatus shown in FIG. 2.
Figure 4:
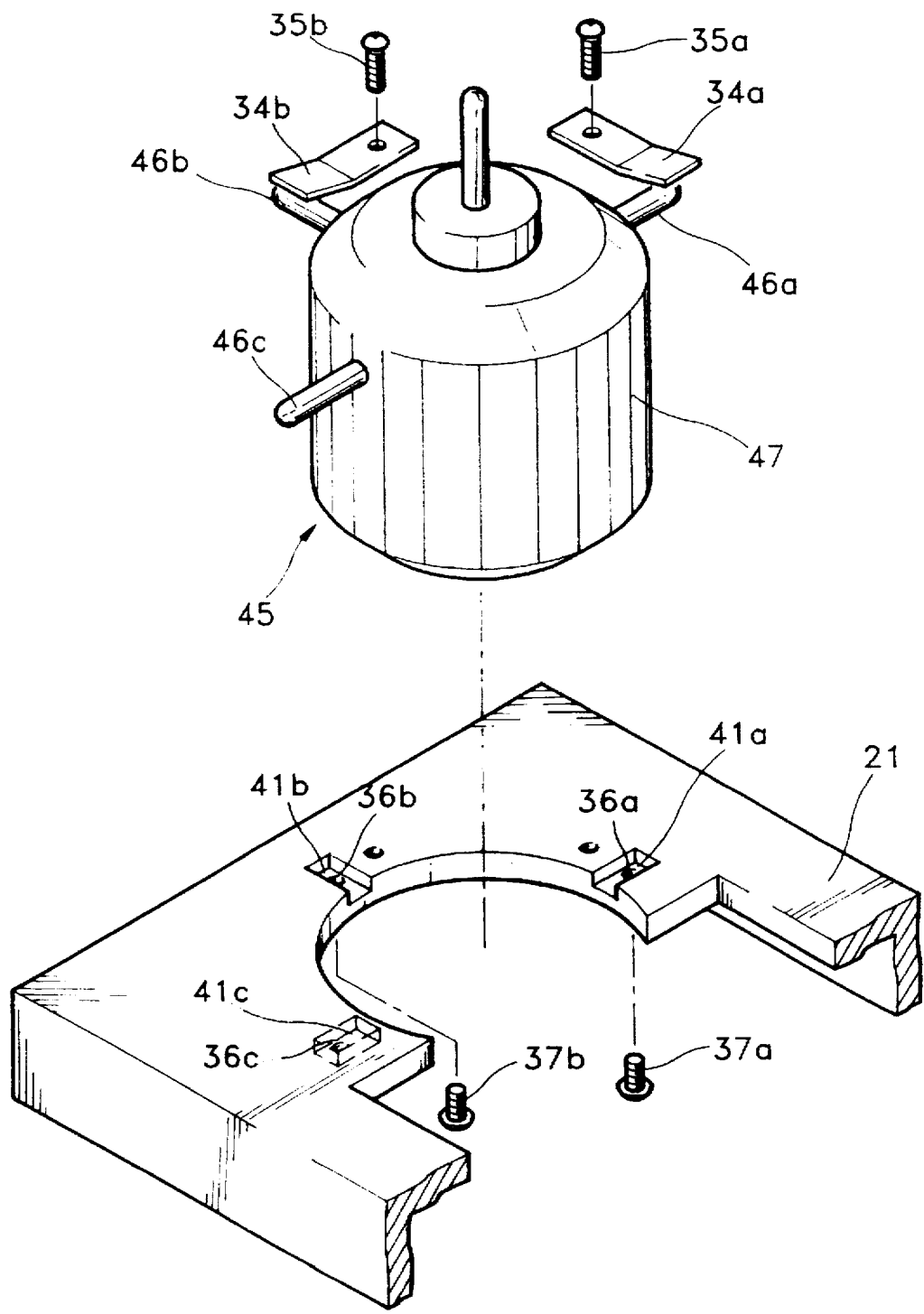
FIG. 4 is an exploded perspective view showing another embodiment of means for correcting the installation angle of the spindle motor of the optical recording and reproducing apparatus according to the present invention.

In FIG. 4, another embodiment of the means for correcting the installation angle of the spindle motor is shown, wherein the same reference numerals as those of FIG. 3 indicate like elements. According to this embodiment, horizontal protrusions 46a, 46b, and 46c are directly formed on the body of the housing 47 of a spindle motor 45. The horizontal protrusions 46a and 46b are respectively set in the grooves 36a and 36b whose upper portions are open. The other horizontal protrusion 46c is inserted in the groove 36c only whose one side is open. The angle of the spindle motor 45 can be corrected in the same way as the embodiment shown in FIG. 3. The spindle motor 45 having protrusions 46a, 46b, and 46c can be easily assembled and manufactured.

The optical recording and reproducing apparatus according to the present invention has an advantage in that the tilt angle of the optical axis is easily corrected by adjusting the installation angle of the spindle motor, thereby improving the performance thereof. Especially, since the correction of such a tilt angle of the optical axis does not depend on the machining precision of parts, the burden of developing and machining the parts can be reduced.

The present invention is not restricted to the above embodiments, and it is clearly understood that many variations are possible within the scope and spirit of the present invention by anyone skilled in the art.

What is claimed is:

1. An optical recording and reproducing apparatus, comprising:

a deck;

a spindle motor having a shaft and installed on said deck;

a turn table attached to the shaft of said spindle motor; and means for correcting the installation angle of said spindle motor in order to correct the tilt angle of said turn table in multiple directions, wherein a plurality of grooves are formed in said deck, said grooves having a plurality of adjusting screw holes formed in respective bottom portions thereof, and wherein said correcting means comprises:

a motor housing for housing said spindle motor, said motor housing having a plurality of horizontal protrusions formed on an outer surface thereof, said protrusions being inserted in and supported by said plurality of grooves;

elastic members fixed on an upper surface of said deck, for flexibly pressing said plurality of horizontal protrusions against said plurality of grooves; and correcting screws inserted into said adjusting screw holes and end portions of said correcting screws contacting the bottom surfaces of said horizontal protrusions.

2. An optical recording and reproducing apparatus as claimed in claim 1, wherein said plurality of grooves include at least two grooves formed in the radial direction of a disk.

3. An optical recording and reproducing apparatus as claimed in claim 2, further comprising a base groove whose one side is open for inserting one of said horizontal protrusions therein.

4. An optical recording and reproducing apparatus, comprising:

a deck;

a spindle motor having a shaft and installed on said deck;

a turn table attached to the shaft of said spindle motor; and means for correcting the installation angle of said spindle motor in order to correct the tilt angle of said turn table in multiple directions, wherein a plurality of grooves are formed in said deck, said grooves having a plurality of adjusting screw holes formed in the bottoms thereof, and wherein said correcting means comprises:

a plurality of horizontal protrusions which are inserted in and supported by said plurality of grooves, said protrusions formed on the outer surface of said spindle motor;

elastic members fixed to an upper surface of said deck, for pressing said plurality of horizontal protrusions against said plurality of grooves; and correcting screws inserted in said adjusting screw holes and end portions of said correcting screws contacting bottom surfaces of said horizontal protrusions.

5. An optical recording and reproducing apparatus as claimed in claim 4, wherein said plurality of grooves include at least two grooves formed in the radial direction of a disk.

6. An optical recording and reproducing apparatus as claimed in claim 5, further comprising a base groove having an opening for inserting one of said horizontal protrusions therein.

7. An optical recording and reproducing apparatus, comprising:

a deck;

a spindle motor having a shaft and installed on said deck;

a turn table attached to the shaft of said spindle motor; and a correcting mechanism which corrects the installation angle of said spindle motor in order to correct the tilt angle of said turn table, wherein a plurality of grooves are formed in said deck, said grooves having a plurality of adjusting screw holes formed in respective bottom portions thereof, and wherein said correcting mechanism comprises:

a motor housing for housing said spindle motor, said motor housing having a plurality of horizontal protrusions formed on an outer surface thereof, said protrusions being inserted in and supported by said plurality of grooves;

elastic members fixed on an upper surface of said deck, for flexibly pressing said plurality of horizontal protrusions against said plurality of grooves; and correcting screws inserted into said adjusting screw holes and end portions of said correcting screws contacting bottom surfaces of said horizontal protrusions.

8. An optical recording and reproducing apparatus, comprising:

a deck;

a spindle motor having a shaft and installed on said deck;

a turn table attached to the shaft of said spindle motor; and a correcting mechanism which corrects the installation angle of said spindle motor in order to correct the tilt angle of said turn table, wherein a plurality of grooves are formed in said deck, said grooves having a plurality of adjusting screw holes formed in the bottoms thereof, and wherein said correcting mechanism comprises:

a plurality of horizontal protrusions which are inserted in and supported by said plurality of grooves, said protrusions formed on an outer surface of said spindle motor;

elastic members fixed to an upper surface of said deck, for pressing said plurality of horizontal protrusions against said plurality of grooves; and correcting screws inserted in said adjusting screw holes and end portions of said correcting screws contacting bottom surfaces of said horizontal protrusions.

\* \* \* \* \*